US 6,175,079 B1

(12) United States Patent
Johnston et al.

(10) Patent No.: US 6,175,079 B1
(45) Date of Patent: Jan. 16, 2001

(54) FIBER OPTIC CABLE MANAGEMENT SYSTEM

(75) Inventors: Dare P. Johnston, Hickory, NC (US); Michael Mattei, Smithtown, NY (US); Robert P. Auteri, Hickory, NC (US); Erwin F. Hani; Michael T. Herda, both of Charlotte, NC (US); Steven J. Muske, Batavia, OH (US); David W. Suttie, Onalaska, WI (US)

(73) Assignee: Tyco Electronics Corporation, Fuquay-Varina, NC (US)

( * ) Notice: Under 35 U.S.C. 154(b), the term of this patent shall be extended for 0 days.

(21) Appl. No.: 09/325,268

(22) Filed: Jun. 3, 1999

Related U.S. Application Data

(60) Provisional application No. 60/120,788, filed on Feb. 19, 1999.

(51) Int. Cl.[7] .................................................. H01J 15/00
(52) U.S. Cl. ...................... 174/50; 174/DIG. 9; 312/223
(58) Field of Search ................................ 174/50, DIG. 9; 312/222, 223

(56) References Cited

U.S. PATENT DOCUMENTS

| Re. 34,955 | 5/1995 | Anton et al. . |
| 2,669,499 | * 2/1954 | Vanderplank ........................ 312/322 |
| 3,341,268 | 9/1967 | Bickford . |
| 4,502,754 | 3/1985 | Kawa . |
| 4,558,172 | 12/1985 | Zetena . |
| 4,595,255 | 6/1986 | Bhatt et al. . |
| 4,630,886 | 12/1986 | Lauriello et al. . |
| 4,699,455 | 10/1987 | Erbe et al. . |
| 4,708,430 | 11/1987 | Donaldson et al. . |
| 4,752,110 | 6/1988 | Blanchet et al. . |
| 4,824,196 | 4/1989 | Bylander . |
| 5,011,257 | 4/1991 | Wettengel et al. . |
| 5,109,467 | * 4/1992 | Hogan et al. ......................... 385/135 |
| 5,399,010 | * 3/1995 | McClung et al. ................. 312/322 X |
| 5,969,294 | * 10/1999 | Eberle et al. ........................... 174/57 |
| 6,061,966 | * 5/2000 | Nelson et al. .......................... 49/394 |

* cited by examiner

Primary Examiner—Dean A. Reichard
(74) Attorney, Agent, or Firm—Adams, Schwartz & Evans, P.A.

(57) ABSTRACT

A fiber optic cable management system includes a cabinet defined by cabinet walls and having an interior mounting surface for carrying cable management components adapted for managing fiber optic cable within the cabinet. The mounting surface is spaced-apart from and cooperates with an adjacent one of the cabinet walls to define a door-receiving compartment inside the cabinet between the mounting surface and the adjacent wall. A cable access door is pivotably attached to the cabinet, and is adapted for pivoting movement between a closed position and an open position, and for sliding movement from the open position to a hidden position inside the cabinet and within the door-receiving compartment. Attachment rails are provided for pivotably attaching the access door to the cabinet, and for permitting sliding movement of the access door from the open position to the hidden position.

18 Claims, 15 Drawing Sheets

FIBER OPTIC CABLE MANAGEMENT SYSTEM

TECHNICAL FIELD AND BACKGROUND OF THE INVENTION

This patent application corresponds to U.S. Provisional Patent Application No. 60/120,788 filed on Feb. 19, 1999. This invention relates to fiber optic cable management within an area such as a telecommunications central office, headend for fiber optic television cable, or wiring closet, and more particularly to a modular fiber optic cable management cabinet adapted for mounting on vertical support racks. The cabinet includes novel features and components for collecting, segregating, interconnecting, and distributing fiber optic cable within the cabinet. The cabinet has a removable front access door which is pivotable from a closed position to an open position, and slidable from the open position to a hidden position within a door-receiving compartment inside the cabinet. The compartment is shielded from the cables, thus avoiding any risk of contacting or damaging the cables when moving the door from the open position to the hidden position. Fiber optic cable exiting the cabinet is routed through a raceway assembly, such as described in Applicant's copending application Ser. No. 09/220,267. The complete disclosure of this application is incorporated herein by reference.

SUMMARY OF THE INVENTION

It is an object of the invention to provide a fiber optic cable management system including a number of modular, rack-mounted cabinets applicable for collecting, interconnecting, terminating, segregating, splicing, and distributing fiber optic cable.

It is another object of the invention to provide a cabinet which is formed of lightweight plastic.

It is another object of the invention to provide a cabinet which includes molded, interchangeable parts.

It is another object of the invention to provide a cabinet which includes a pivotable front door which can be used as a writing surface when in the open position.

It is another object of the invention to provide a cabinet with a front door which can be readily removed, or moved to a hidden position inside the cabinet.

It is another object of the invention to provide a cabinet with a front door which is shielded from contact with the cables when moved from the open position to the hidden position inside the cabinet.

It is another object of the invention to provide a cabinet with a front door which is transparent to allow ready viewing of cables and identification labels located inside the cabinet.

It is another object of the invention to provide a cabinet which is adapted for quick and convenient mounting on existing racks.

It is another object of the invention to provide a cabinet which is adapted to provide flexible internal cable management.

It is another object of the invention to provide a cabinet which is easy to assemble.

It is another object of the invention to provide a cabinet which is easy to use.

It is another object of the invention to provide a cabinet which is adapted for accommodating as many as 192 ends of fiber optic cable.

It is another object of the invention to provide a cabinet which includes features for controlling the bend radius of fiber optic cable.

It is another object of the invention to provide a cabinet which includes novel connector plates for interconnecting ends of fiber optic cable together.

It is another object of the invention to provide a cabinet which includes adjustable front and rear clips for bundling and segregating cable entering and exiting the cabinet.

These and other objects of the present invention are achieved in the preferred embodiments disclosed below by providing a fiber optic cable management system. The system includes a cabinet defined by cabinet walls and having an interior mounting surface for carrying cable management components adapted for managing fiber optic cable within the cabinet. The mounting surface is spaced-apart from and cooperates with an adjacent one of the cabinet walls to define a door-receiving compartment inside the cabinet between the mounting surface and the adjacent wall. A cable access door is pivotably attached to the cabinet, and is adapted for pivoting movement between a closed position and an open position, and for sliding movement from the open position to a hidden position inside the cabinet and within the door-receiving compartment. Attachment means are provided for pivotably attaching the access door to the cabinet, and for permitting sliding movement of the access door from the open position to the hidden position.

According to one preferred embodiment of the invention, the attachment means includes a pair of spaced-apart door rails located at opposite sides of the door-receiving compartment and between the interior mounting surface and the adjacent cabinet wall for guiding movement of the door between the open position and the hidden position within the compartment.

According to another preferred embodiment of the invention, the door rails have respective longitudinal grooves extending from one end to the other. The access door has first and second outwardly projecting pins received within respective grooves of the door rails and cooperating with the door rails to permit sliding movement of the access door into and out of the door-receiving compartment.

According to yet another preferred embodiment of the invention, the door rails have respective notches communicating with the grooves for receiving the pins of the access door into the grooves, and for removable attachment of the access door from the cabinet.

According to yet another preferred embodiment of the invention, the door rails have respective integrally-formed bearings within which the pins of the access door rotate as the access door is pivoted between the open and closed positions.

According to yet another preferred embodiment of the invention, the cabinet includes a plurality of cable access openings formed with the cabinet walls for receiving and distributing fiber optic cable entering and exiting the cabinet.

According to yet another preferred embodiment of the invention, at least one of the cable access openings has an outwardly curved trumpet flange adapted for controlling the bend radius of fiber optic cable.

According to yet another preferred embodiment of the invention, the cabinet includes a pivoted rear door movable between an open position and a closed position.

According to yet another preferred embodiment of the invention, the cabinet has separate, interchangeable, top and bottom cabinet sections.

According to yet another preferred embodiment of the invention, opposing removable spacers are located between the cabinet sections for adjusting the height of the cabinet.

According to yet another preferred embodiment of the invention, mounting brackets are attached to the cabinet and adapted for mounting the cabinet on a vertical support rack.

According to yet another preferred embodiment of the invention, a plurality of rear clips are located inside the cabinet and are carried on the mounting surface for managing fiber optic cable entering the cabinet.

According to yet another preferred embodiment of the invention, the mounting surface includes a rear mounting track extending from one side of the cabinet to the other, and carrying the plurality of rear clips for adjustable sliding movement along the length of the track.

According to yet another preferred embodiment of the invention, a plurality of cable connector plates are located inside the cabinet and extend generally perpendicular to the interior mounting surface for interconnecting respective ends of fiber optic cable.

According to yet another preferred embodiment of the invention, the connector plates include a respective plurality of vertically spaced adaptors.

According to yet another preferred embodiment of the invention, a plurality of front clips are located inside the cabinet, and are carried on the mounting surface for managing fiber optic cable exiting the cabinet.

According to yet another preferred embodiment of the invention, the mounting surface includes a front mounting track extending from one side of the cabinet to the other and carrying the plurality of front clips for adjustable sliding movement along the length of the track.

In another embodiment, a fiber optic cable management system includes a cabinet having separate, interchangeable top and bottom cabinet sections defining respective cabinet walls and cable access openings for receiving and distributing fiber optic cable entering and exiting the cabinet. The cabinet further includes an interior mounting surface for carrying cable management components adapted for managing fiber optic cable within the cabinet. The mounting surface is spaced-apart from and cooperates with an adjacent one of the cabinet walls to define a door-receiving compartment inside the cabinet between the mounting surface and the adjacent wall. A cable access door is pivotably attached to the cabinet, and is adapted for pivoting movement between a closed position and an open position, and for sliding movement from the open position to a hidden position inside the cabinet and within the door-receiving compartment. Attachment means are provided for pivotably attaching the access door to the cabinet, and for permitting sliding movement of the access door from the open position to the hidden position.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
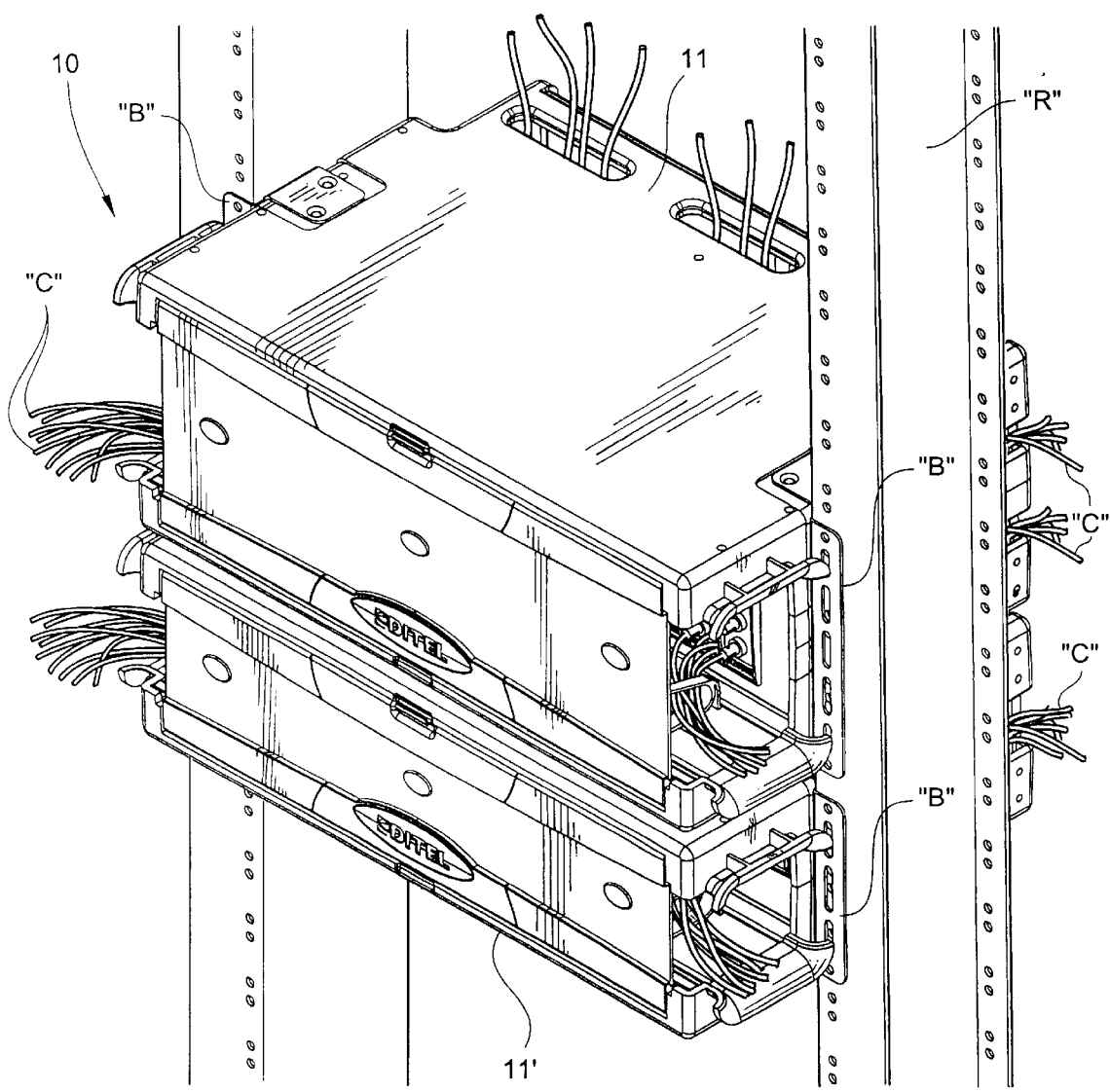
FIG. 1 is a perspective view of a fiber optic cable management system including a pair of stacked, modular cabinets assembled according to one preferred embodiment of the invention.

Referring now specifically to the drawings, a fiber optic cable management system according to the present invention is illustrated in FIG. 1 and shown generally at reference numeral 10. The system 10 has particular application in the telecommunications industry for managing the connection, storage, and distribution of fiber optic cable "C" in a central office. The system 10 includes a number of modular cabinets 11 and 11' with respective mounting brackets "B" used for mounting the cabinets to vertical support racks "R". The system 10 may further include one or more cable storage or splice cabinets (not shown). A single cabinet 11 is described below.

As shown in FIGS. 2–5, the cabinet 11 is formed of identical molded top and bottom sections 14 and 15, a transparent front door 16, and a rear door 17. Each of the top and bottom cabinet sections 14 and 15 includes complementary, integrally-formed side walls 21, 22 and 23, 24, respectively. The side walls 21, 22, 23, and 24 cooperate with respective spacers 25A, 25B and 26A, 26B to form opposing sides of the cabinet 11, and to define a number of cable access openings 27, 28, 29, 30, 31, and 32 for receiving and distributing fiber optic cable to and from the cabinet 11. The front access openings 27 and 28 include respective trumpet flanges 34A, 34B and 35A, 35B curved outwardly to control the bend radius of cable exiting the cabinet 11. The optimal minimum bend radius achieved in the present system 10 no less than 2 inches. Additional cable access openings 37, 38, 39, 40, 41, and 42 are formed in the top and bottom cabinet sections to allow convenient cable patching from one cabinet 11 to another. The cabinet 11 is held together using suitable fasteners, such as screws (not shown). The screws pass through openings in respective inwardly-turned ends of mounting brackets "B" and through openings formed in the spacers 25A, 25B and 26A, 26B and top and bottom cabinet sections 14 and 15. The cabinet 11 is formed using pairs of stacked spacers 25A, 25B and 26A, 26B at each side. A smaller cabinet 11', also shown in FIG. 1, is formed using only single spacers at each side. All other features and components of cabinet 11' are identical to that of cabinet 11.

Figure 2:
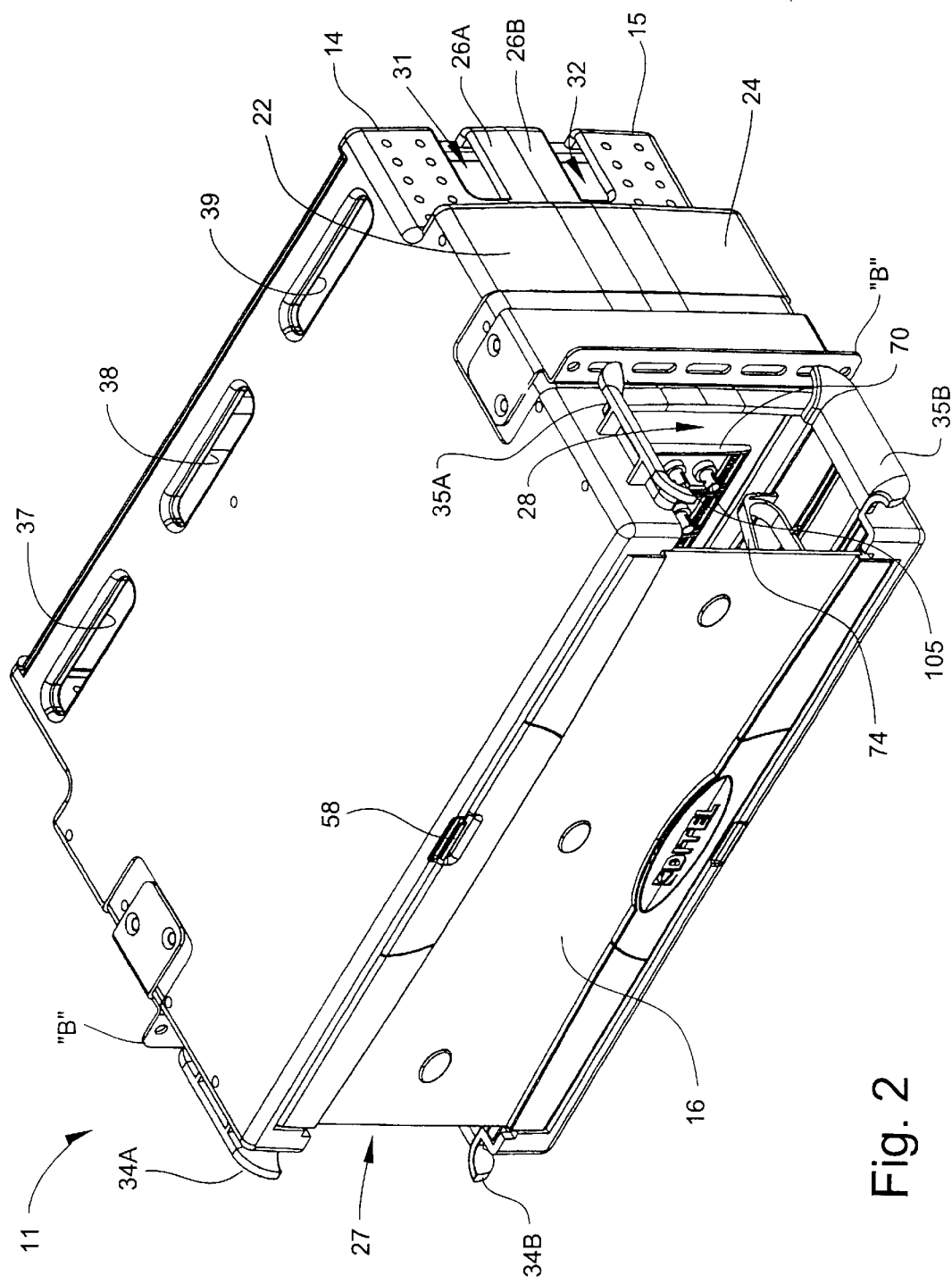
FIG. 2 is a front perspective view of a single cabinet with the front and rear doors closed, and the fiber optic cable removed for clarity.
Figure 3:
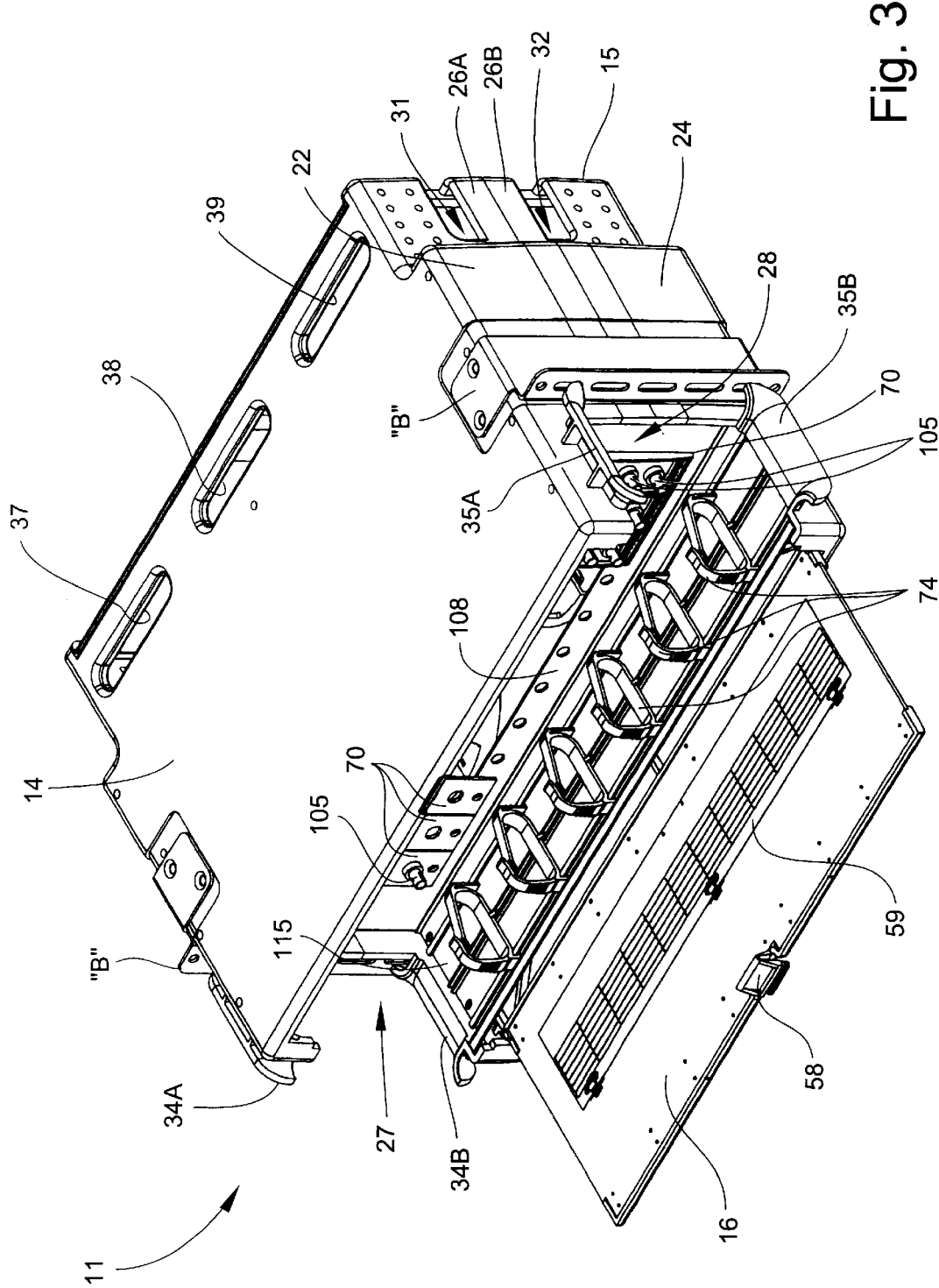
FIG. 3 is a front perspective view of the cabinet with the front door open to show interior components of the cabinet, particularly the adjustable front clips.
Figure 6:
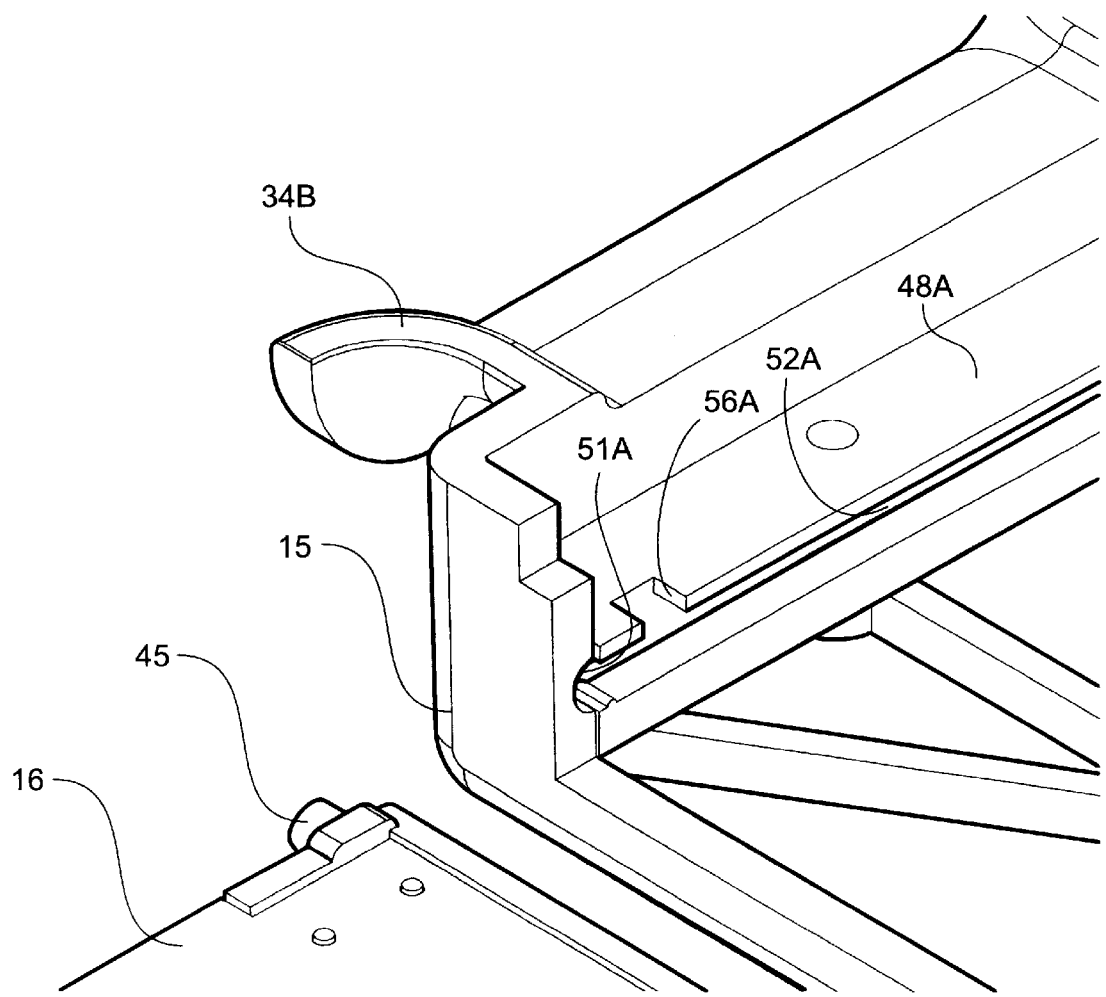
FIG. 6 is an enlarged, fragmentary perspective view of the cabinet with the front door removed.
Figure 7:
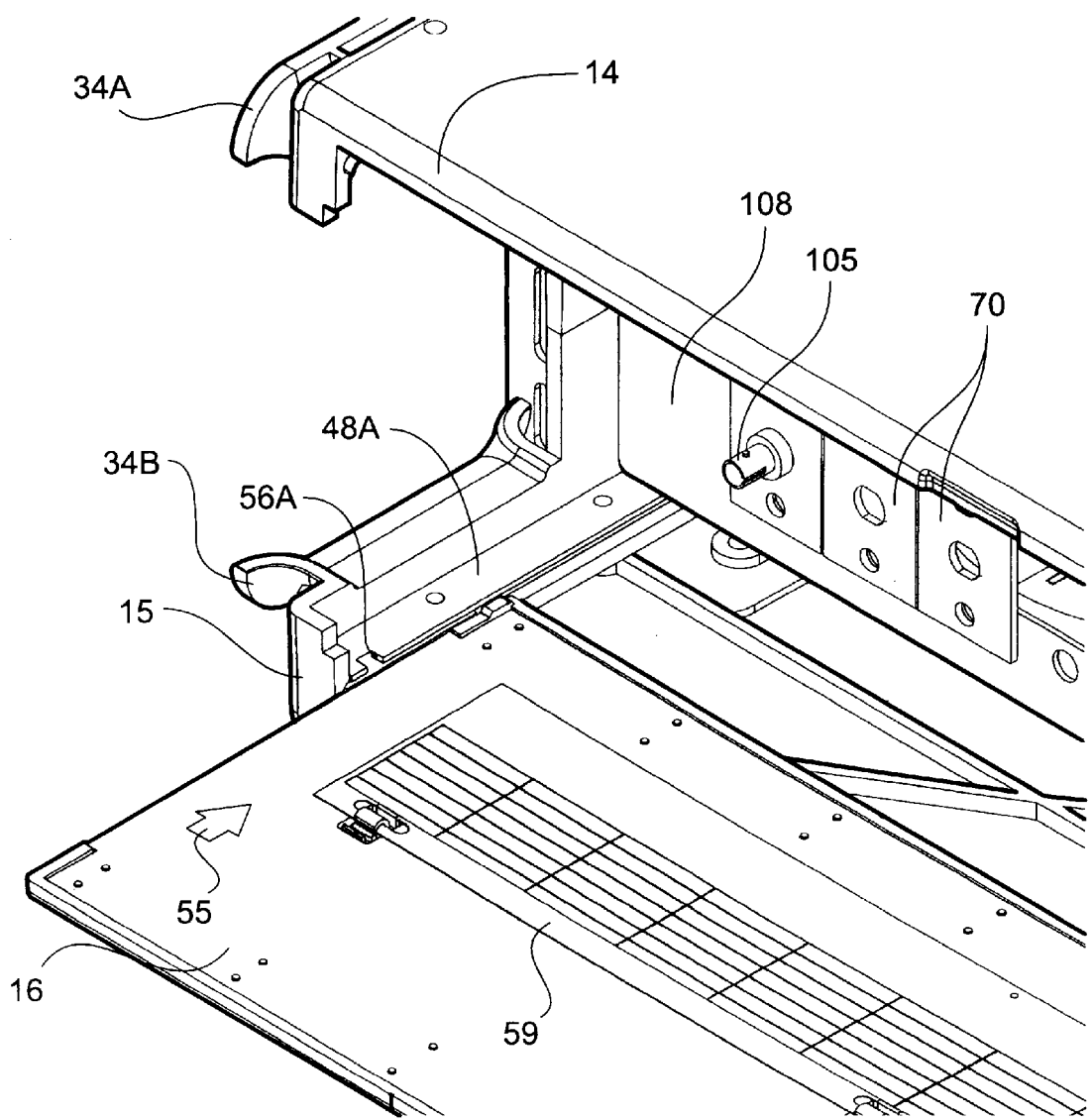
FIG. 7 is fragmentary perspective view of the cabinet showing the front door being moved inwardly into the hidden position inside the cabinet and adjacent the floor of the bottom cabinet section.

The front door 16 of cabinet 11 is pivotably attached at a front edge of the bottom cabinet section 15, and is adapted to move between closed and open positions, shown in FIGS. 2 and 3, respectively, and a hidden position within a door-receiving compartment inside the cabinet 11. The front door 16 includes opposing, outwardly projecting pins 45 and 46, shown in FIG. 5, which extend into respective spaced door rails 48A and 48B mounted to the bottom cabinet section 15. As best shown in FIG. 6, each rail 48A, 48B has an integrally-formed front bearing 51A, 51B (only 51A shown) within which the pin 45, 46 rotates as the door 16 pivots open and closed, and a longitudinal groove 52A, 52B (only 52A shown) extending from the bearing 51A, 51B to an opposite end of the rail 48A, 48B. The bearing 51B and groove 52B for rail 48B is identical to that shown on rail 48A. Once moved to the open position generally parallel to the floor of the bottom cabinet section 15, the front door 16 slides inwardly to the hidden position within the cabinet 11 by gently pushing the door 16 in the direction indicated by arrow 55 in FIG. 7. The pins 45, 46 move out of their respective bearings 51A, 51B and along the grooves 52A, 52B of rails 48A, 48B as the front door 16 slides inside the cabinet 11. Alternatively, the front door 16 is conveniently detached from the cabinet 11 by pushing the door 16 slightly inwardly when in the open position to align the pins 45, 46 with respective notches 56A, 56B formed in the door rails 48A, 48B, and then lifting the door 16 upwardly to remove the pins 45, 46 from the grooves 52A, 52B. The front door 16 is reattached to the cabinet 11 in a reverse manner. Preferably, a closing mechanism 58 is provided for releasably holding the front door 16 closed. In addition, a user chart 59 may be attached to an inside surface of the front door 16 for making written notes.

Figure 4:
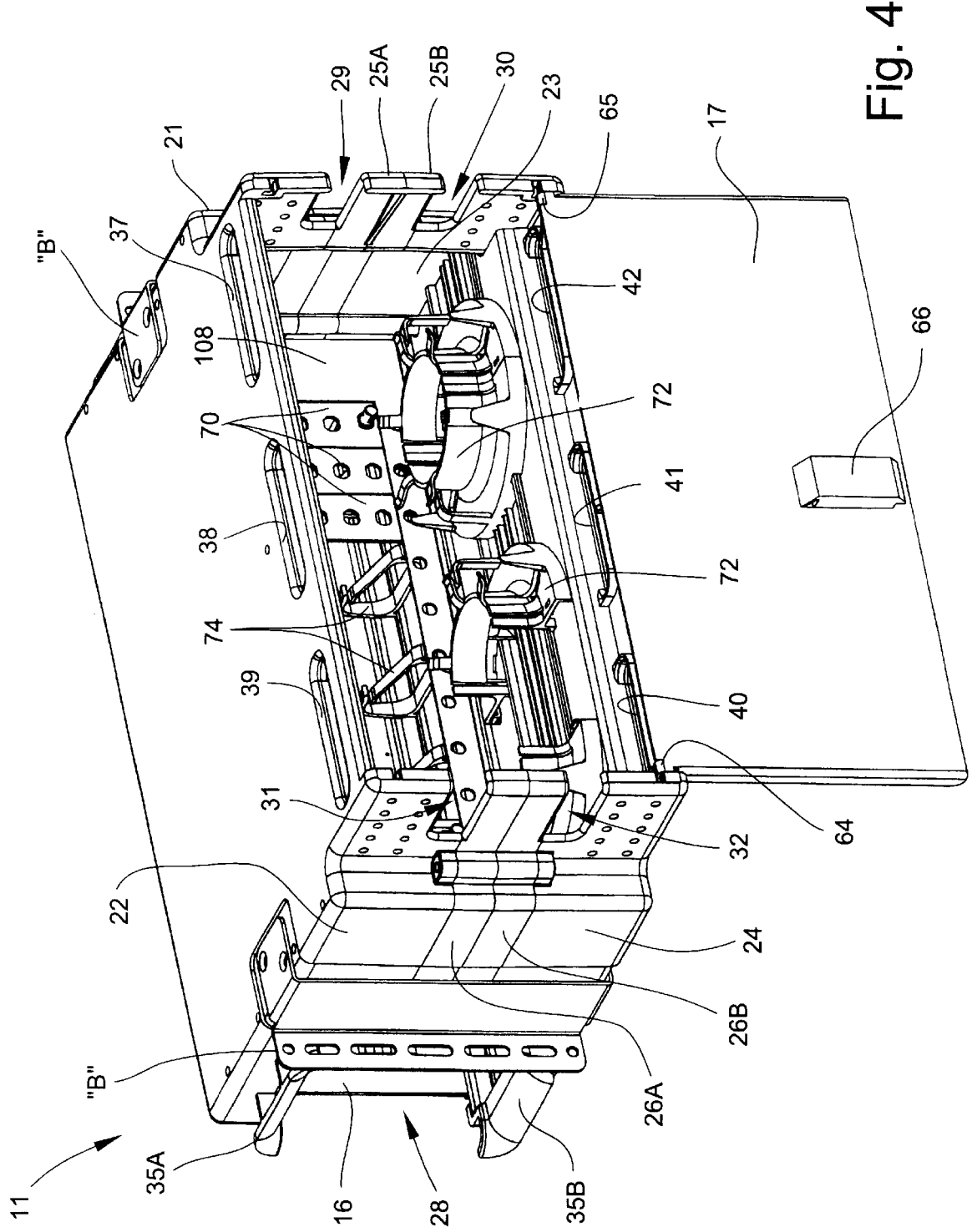
FIG. 4 is rear perspective view of the cabinet with the rear door open to further show interior components of the cabinet, particularly the adjustable rear clips.
Figure 5:
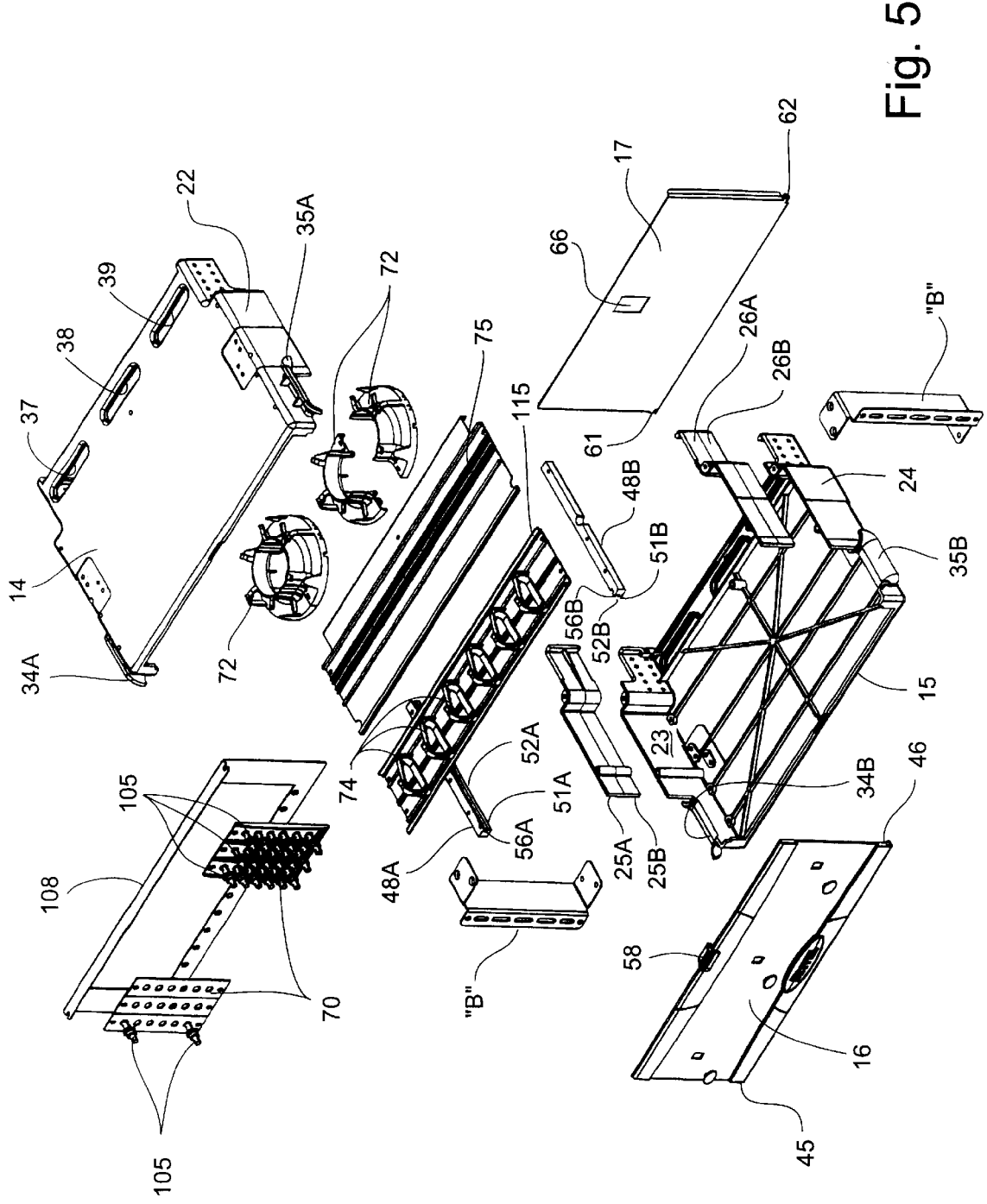
FIG. 5 is an exploded, perspective view of the cabinet.

The rear door 17 of the cabinet 11 is pivotably attached to a rear edge of the bottom section 15 for movement between the closed position shown in FIGS. 2 and 3, and an open position shown in FIG. 4. The rear door 17 includes opposing, outwardly projecting pins 61, 62 extending within respective rear bearings 64, 65 formed with the bottom cabinet section 15. In the open position, the rear door 17 extends downwardly approximately 180 degrees from its closed position. A second closing mechanism 66 is provided for releasably holding the rear door 17 closed.

Figure 8:
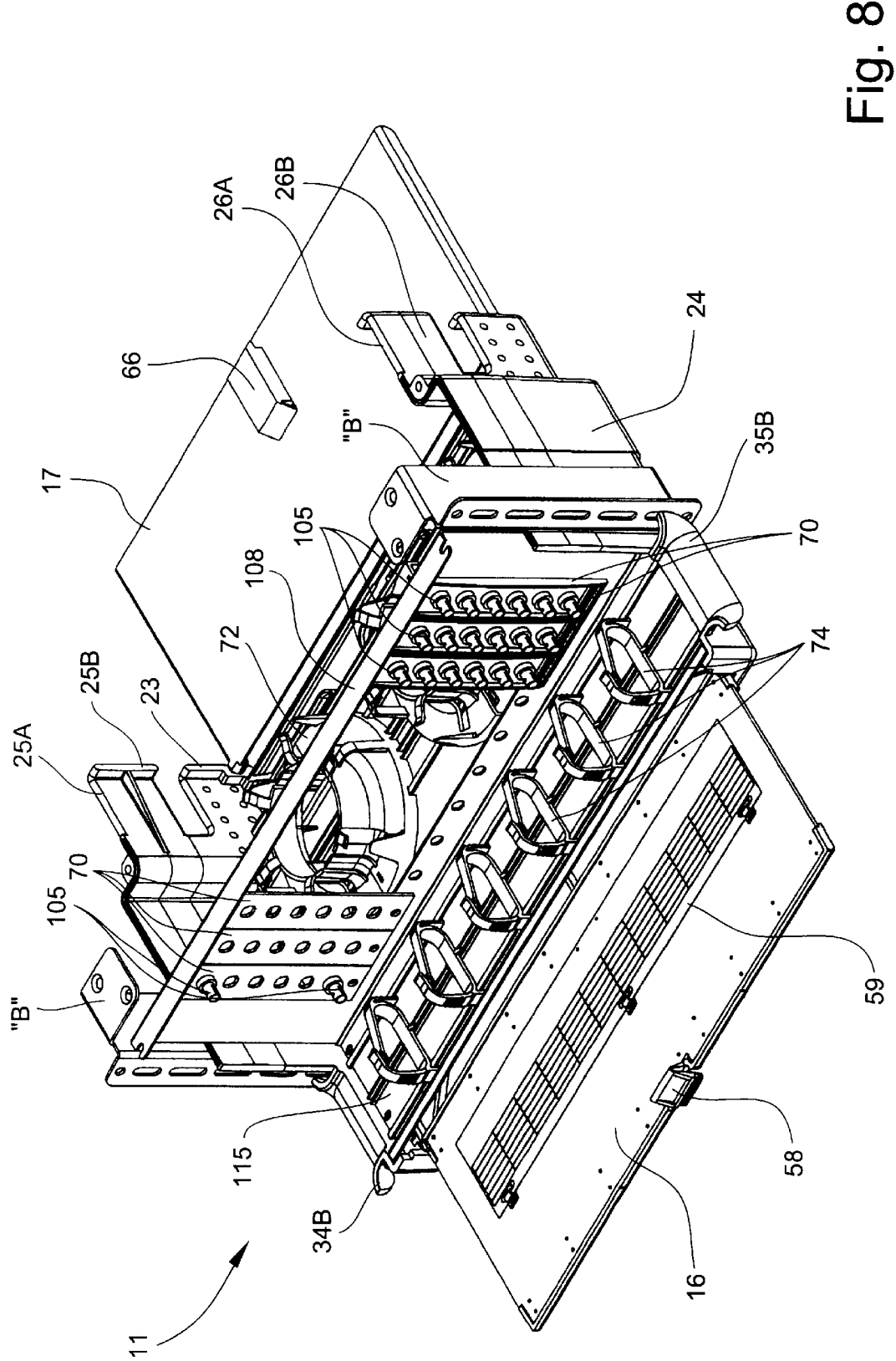
FIG. 8 is a front perspective view of the cabinet with the top cabinet section removed to illustrate interior components of the cabinet.
Figure 9:
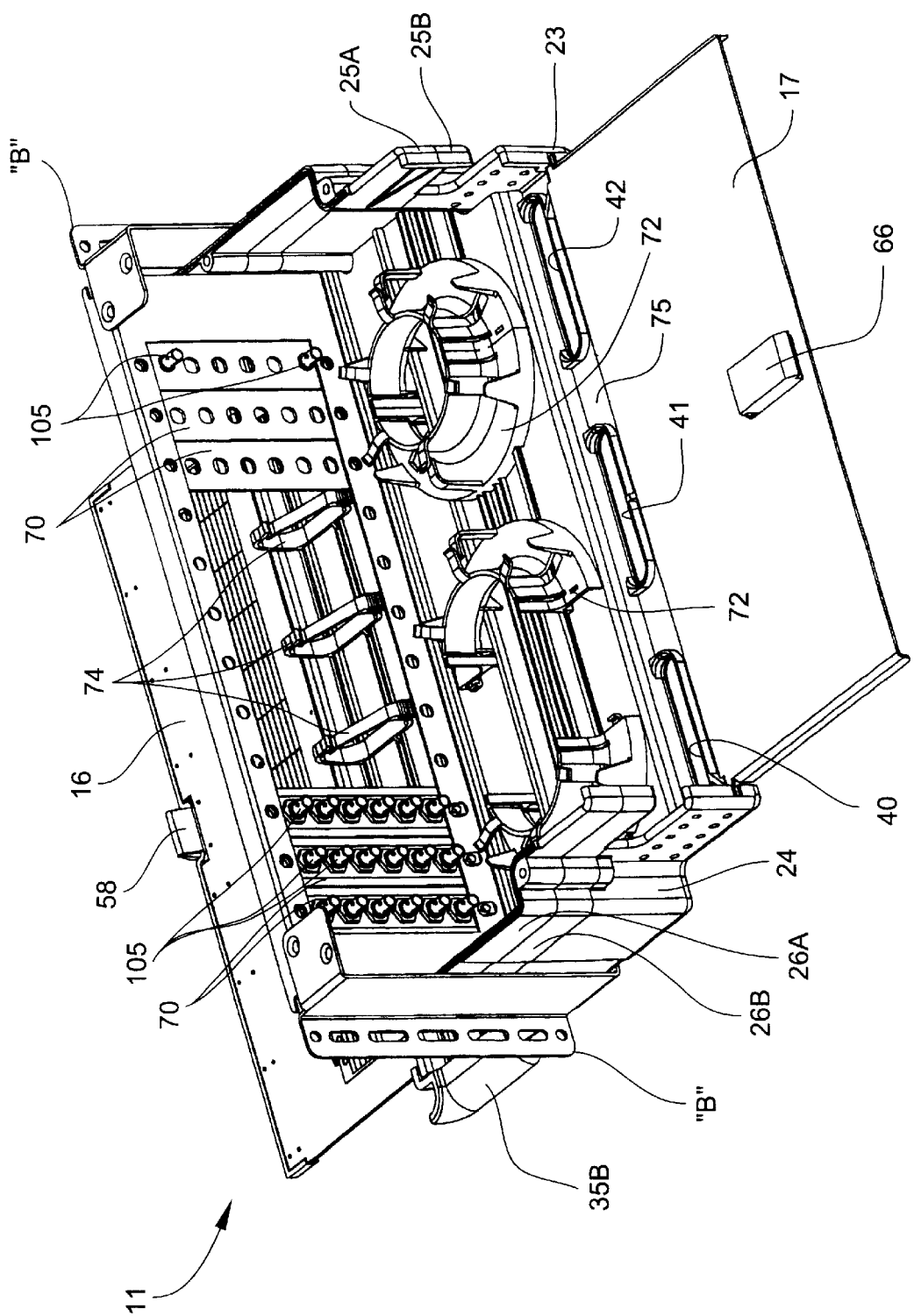
FIG. 9 is a rear perspective view of the cabinet with the top cabinet section removed.

Referring now to FIGS. 8 and 9, the interior of the cabinet 11 includes a number of connector plates 70 for interconnecting ends of fiber optic cable entering and exiting the cabinet 11. One or more spaced, adjustable rear clips 72 are mounted to the rear of the connector plates 70 for collecting and segregating fiber optic cable entering the cabinet 11 through rear access openings 29, 30, 31, and 32 (See FIG. 4). A number of adjustable front clips 74 are mounted to the front of the connector plates 70, and serve to route and segregate cables exiting the cabinet 11 through front access openings 27 and 28 (See FIG. 3). These components of the cabinet 11 are described further below.

Rear Clips 72

Figure 10:
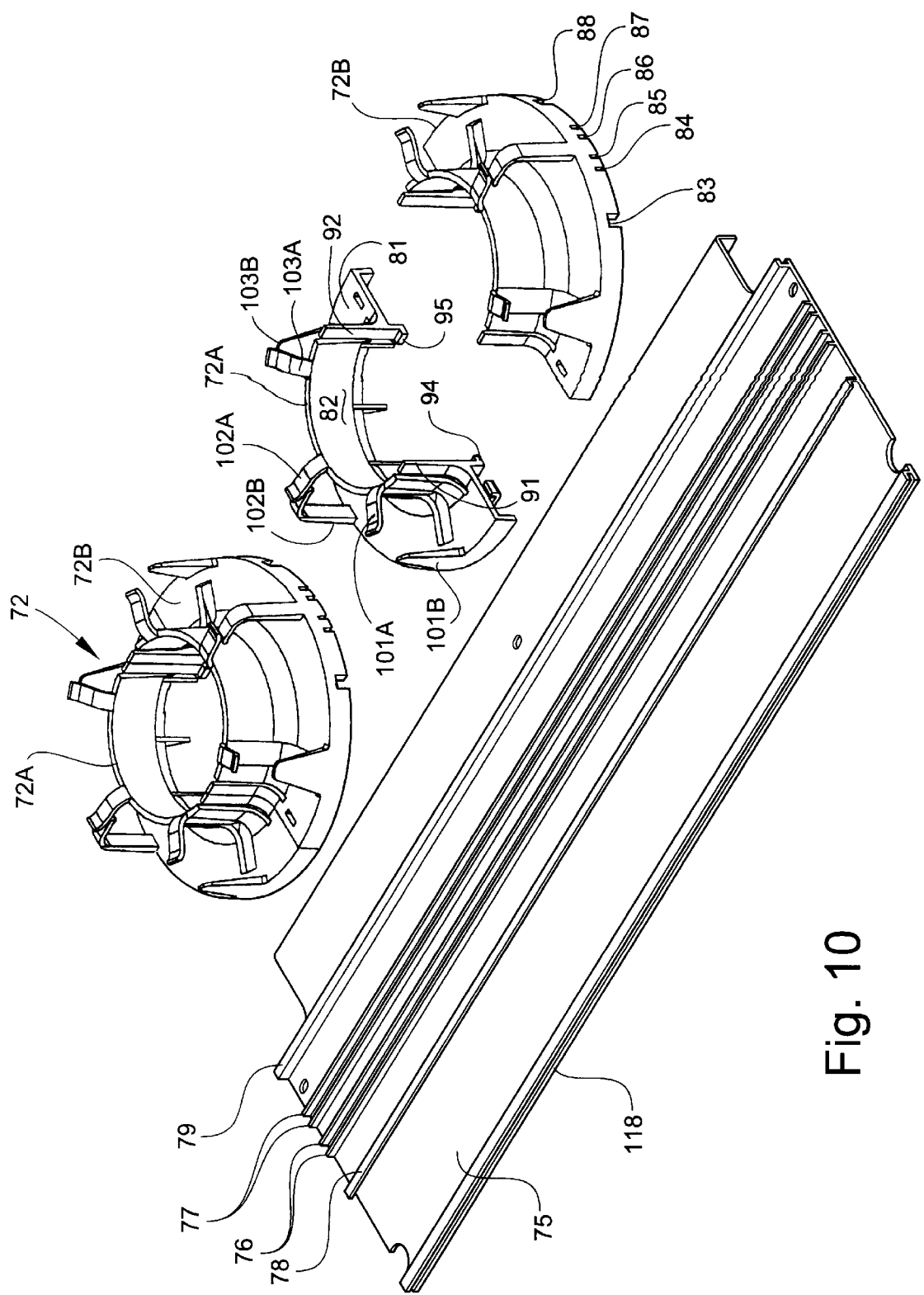
FIG. 10 is perspective view of the rear clips and mounting track with the rear clips detached.
Figure 11:
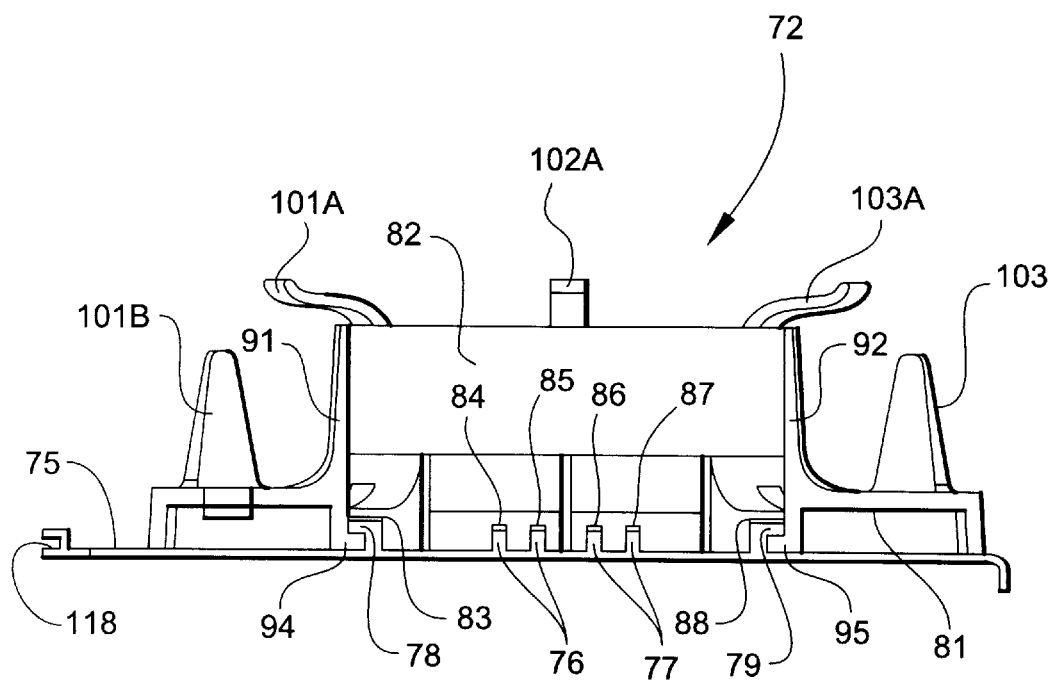
FIG. 11 is a side elevational view showing the rear clip attached to the mounting track.

As shown in FIGS. 10 and 11, the rear clip 72 is formed in two identical, arcuate halves 72A and 72B attached separately to a rear mounting track 75 secured to the floor of the bottom cabinet section 15. The mounting track 75 includes two sets of inner longitudinal guide rails 76 and 77 and two outer longitudinal mounting rails 78 and 79. Each half 72A, 72B includes a base 81 for engaging the track 75, and an integrally-formed upwardly-turned web 82. The base 81 has a series of notches 83, 84, 85, 86, 87, and 88 formed along its outer peripheral edge for accommodating the rails 76–79 of the track 75, as shown in FIG. 11, and first and second flexible legs 91 and 92 extending upwardly adjacent the web 82 at opposite ends of the clip half 72A, 72B. The vertical legs 91, 92 include respective inward extending mounting feet 94, 95 adapted to frictionally engage the track 75 along the mounting rails 78, 79. The mounting rails 78, 79 have corresponding outward extending lips 96, 97 which cooperate with the feet 94, 95 to prevent the clip halves 72A, 72B from inadvertently pulling off the track 75 when in use. The clip halves 72A, 72B are repositioned along or removed from the track 75 by the user by simultaneously squeezing the top ends of the legs 91, 92 towards each other using the thumb and forefinger to flex the feet 94, 95 out of engagement with the mounting rails 78, 79.

When brought together on the track 75, the two halves 72A, 72B cooperate to form an annular reel for collecting excess fiber optic cable fed into the cabinet 11 to the connector plates 70. For accommodating greater lengths of excess cable, the two halves 72A, 72B can be readily separated and spread apart along the length of the track 75. Alternatively, each half 72A, 72B may be used separately to segregate and feed cable directly to one or more selected connector plates 70. The curved webs 82 of the clip halves 72A, 72B are preferably designed to prevent the cable from exceeding the minimum 2-inch bend radius requirement.

The cable is held within the rear clip 72 by pairs of cooperating, flexible retainer arms 101A, 101B, 102A, 102B, and 103A, 103B extending radially outward from a top edge of the web 82 and upwardly from an outer edge of the base 81, respectively. Each of the top arms 101A, 102A, and 103A includes a slight upwardly-turned free end to facilitate placement of the cable within the clip halves 72A, 72B. The bottom arms 101B and 103B located at each end of the clip half 72A, 72B are relatively stiff and wide to provide increased control of the bend of the cable around the web 82. The middle bottom arm 102B is narrower, longer and more flexible, and serves primarily to bundle the cable together.

Connector Plates 70

From the rear clips 72, the connecting ends of fiber optic cable entering the cabinet 11 mate with respective adapters 105 secured to a number of cable connector plates 70. The connector plates 70 are vertically mounted to a frame 108 centrally positioned within the cabinet 11, as best shown in FIGS. 8 and 9. The frame 108 mounts above the side door rails 48A, 48B such that movement of the front door 16 to the hidden position, as previously described, does not interfere with any cable connections. FIGS. 12–15 illustrate various embodiments of connector plates 70A, 70B, and 70C used in the present cabinet 11.

Figure 12:
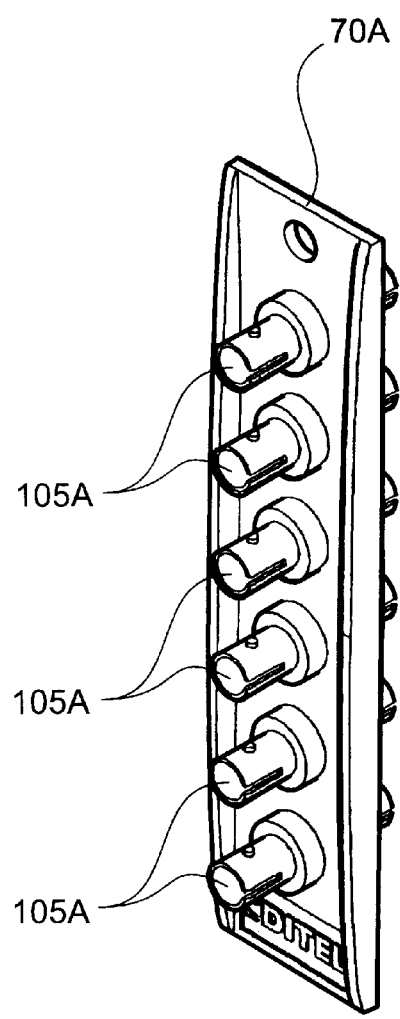
FIG. 12 is a perspective view of a connector plate with attached adapters according to one preferred embodiment.
Figure 13:
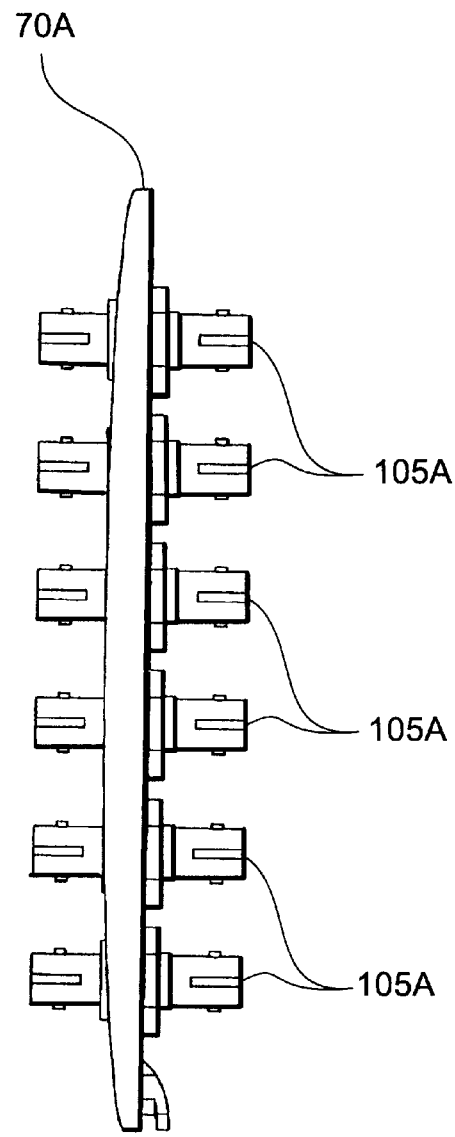
FIG. 13 is a side elevational view of the connector plate and adapters shown in FIG. 12.

Referring to FIGS. 12 and 13, the connector plate 70A is designed for holding 6 adapters 105A generally perpendicular to the front and rear faces of the plate 70A. The adapters 105A interconnect the cables entering and exiting the cabinet 11 in precise optical alignment so as to provide an uninterrupted and undistorted signal transmission through the connected cables downstream to signal termination panels and other equipment. For increased rigidity, the connector plate 70A preferably includes opposing side walls 111 and 112 extending perpendicularly outward from the front or rear face of the plate 70A. Each side wall 111, 112 tapers downward towards opposite ends of the connector plate 70A to provide greatest strength at the center of the plate 70A.

Figures 14, 15:
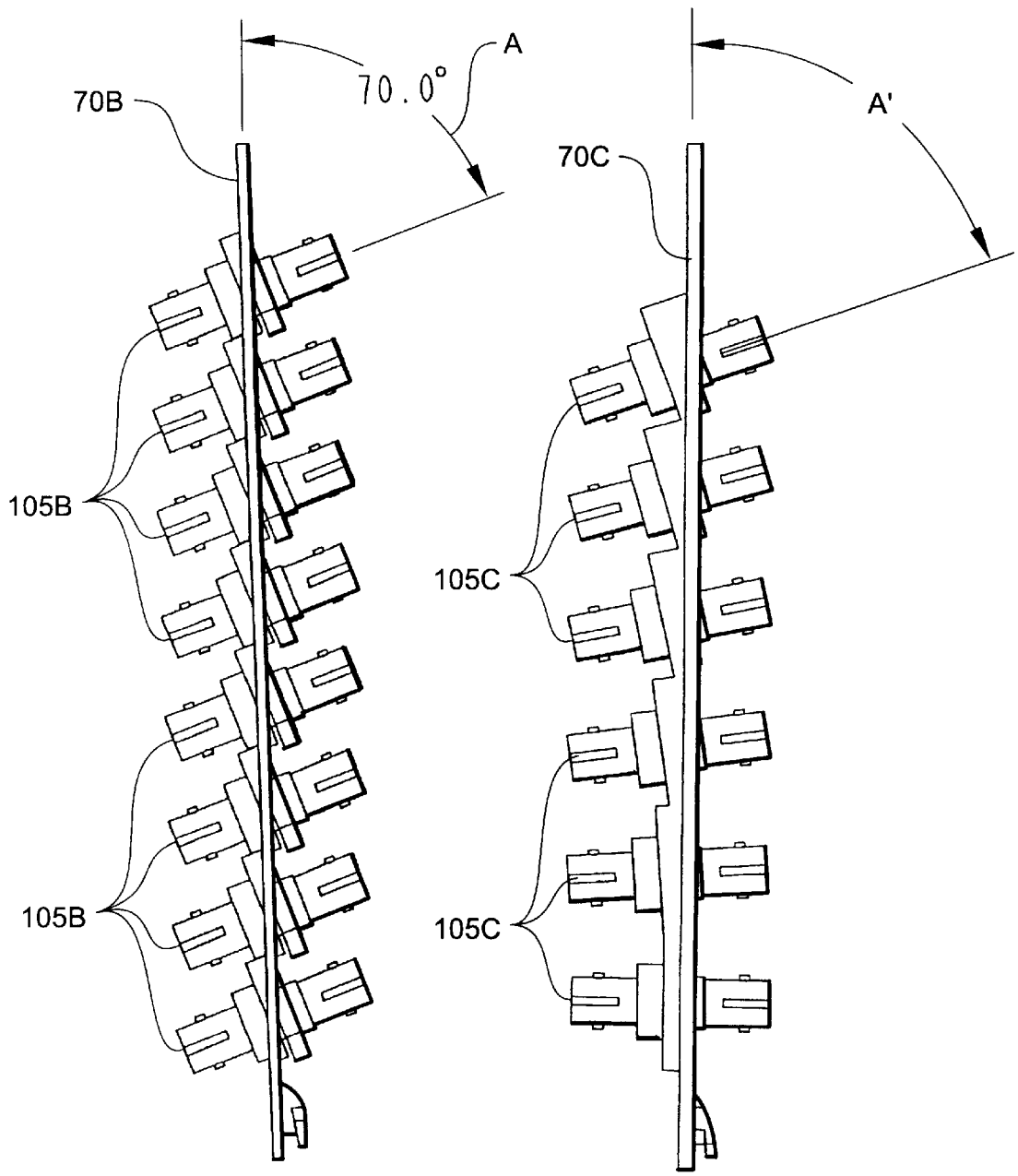
FIG. 14 is a side elevational view of a connector plate with attached adapters according to a second preferred embodiment.
FIG. 15 is a side elevational view of a connector plate with attached adapters according to a third preferred embodiment.

A further embodiment of a cable connector plate 70B is shown in FIG. 14. The connector plate 70B is designed for holding 8 adapters 105B at a constant angle relative to the front and rear faces of the plate 70B. Preferably, the angle "A" for each of the adapters 105B is approximately 70 degrees. The angled adapters 105B facilitate cable interconnection within the cabinet 11 to avoid substantial bending which may disrupt signal transmission through the cable.

A third embodiment of a cable connector plate 70C is shown in FIG. 15. The connector plate 70C is designed for holding 6 adapters 105C at varying angles relative to the front and rear faces of the plate 70C. The angle "A" of the first, top adapter is approximately 70 degrees. The corresponding angle of the second adapter is approximately 74 degrees. The angle of the third adapter is approximately 78 degrees. The angle of the fourth adapter is approximately 82 degrees. The angle of the fifth adapter is approximately 86 degrees. The angle of the sixth and bottom adapter is approximately 90 degrees. By angling the adapters 105C according to the above pattern, the cables utilize a greater amount of available space within the cabinet 11 and are more effectively distributed from the floor of the cabinet 11 to the ceiling without compromising the 2-inch minimum bend radius requirement.

Front Clips 74

Figure 16:
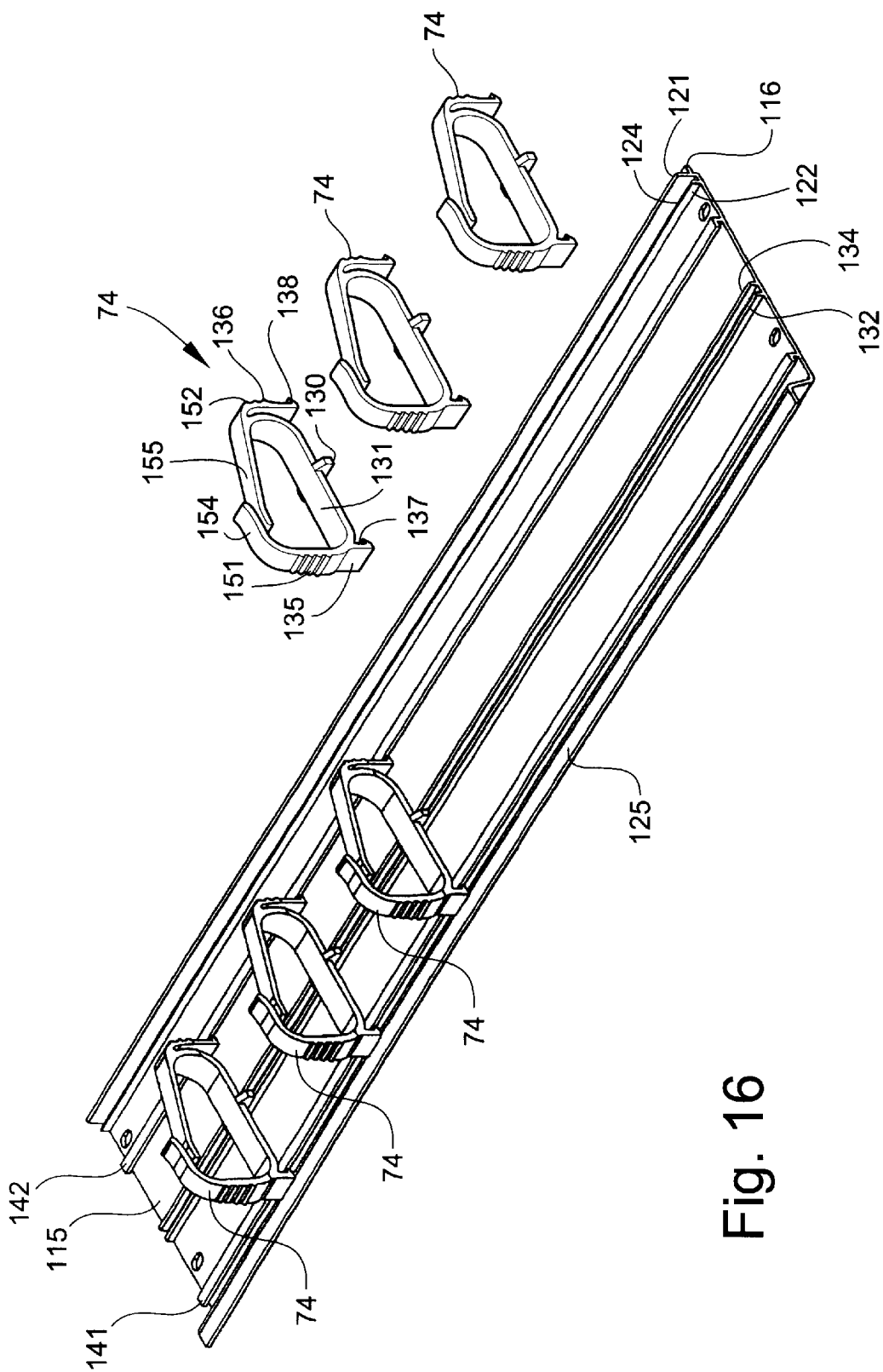
FIG. 16 is a perspective view of the front clip and mounting track with some of the clips removed from the track.
Figure 17:
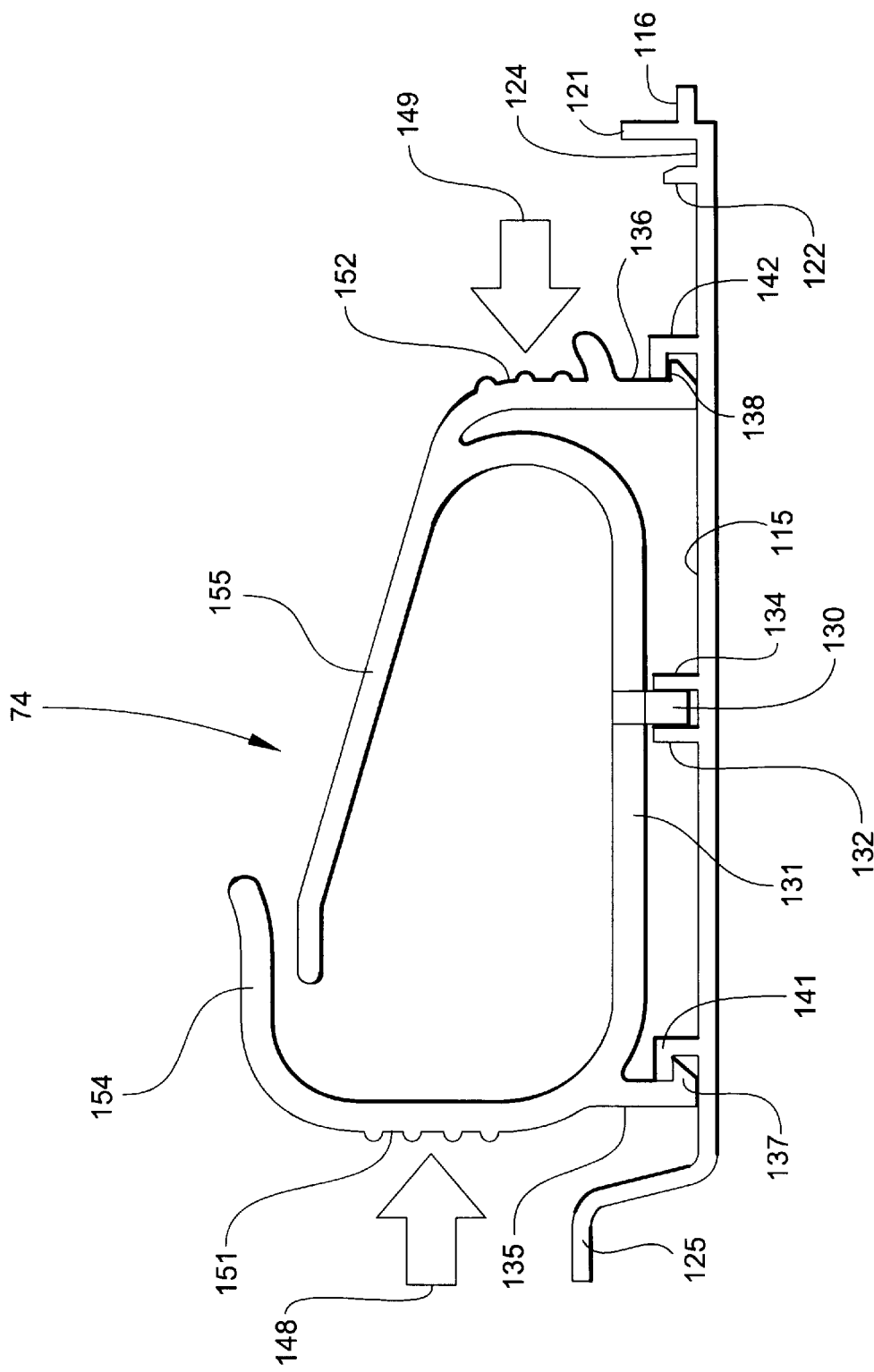
FIG. 17 is a side elevational view showing the front clip attached to the mounting track.

Referring now to FIGS. 8, 16, and 17, from the connector plates 70, the cables are bundled together and segregated within respective front clips 74 slidably carried on a front mounting track 115. The front track 115 is secured to the floor of the bottom cabinet section 15, and includes a longitudinally-extending tongue 116 formed along its rear edge for mating with a complementary groove 118 formed with a front edge of the rear track 75 (See FIG. 10). The tongue 116 of the front mounting track 115 extends outwardly from a longitudinal flange 121 which cooperates with a smaller flange 122 to form a groove 124 for holding a bottom edge of the connector frame 108 (See FIGS. 8 and 9). In addition, the front longitudinal edge 125 of the mounting track 115 is preferably angled to accommodate attachment and detachment of the front door 16, as previously described.

As best shown in FIGS. 16 and 17, each front clip 74 includes a center guide 130 formed with its base 131 for being positioned between rails 132 and 134 formed with the front track 115, and opposing outer legs 135 and 136 with rearwardly turned mounting feet 137 and 138 for frictionally engaging respective mounting rails 141 and 142. The mounting 141 and 142 include respective forwardly turned lips 144 and 145 to prevent the clips 74 from inadvertently pulling off of the track 115 during use. The front clips 74 are repositioned along or removed from the track 115 by simultaneously squeezing opposite sides of the clip 74 in the direction indicated by arrows 148 and 149 in FIG. 16 such that the mounting feet 137, 138 move out of frictional contact with the mounting rails 141, 142. Preferably, the clip 74 includes respective areas of closely spaced ridges 151 and 152 used for gripping.

The fiber optic cable exiting the cabinet 11 is retained in the front clip 74 by flexible arms 154 and 155. The first arm 154 extends slightly over and above an end of the second arm 155 to facilitate placement of the cables within the clip 74, and to resist inadvertent separation of one or more cable from the bundled group. Upon exiting the cabinet 11, the cables are further protected against over bending by the trumpet flanges 34A, 34B and 35A, 35B attached at the front access openings 27 and 28.

The rear and front mounting tracks 75 and 115 and panel support frame 108 reside above the spaced door rails 48A and 48B and cooperate with the bottom wall of the cabinet section 15 to form a separate compartment inside the cabinet 11 for receiving the front door 16 in the hidden position without contacting and potentially damaging the cables "C".

A fiber optic cable management cabinet is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A fiber optic cable management system, comprising:
   (a) a cabinet defined by cabinet walls and comprising an interior mounting surface for carrying cable management components adapted for managing fiber optic cable within said cabinet, said mounting surface being spaced-apart from and cooperating with an adjacent one of said cabinet walls to define a door-receiving compartment inside said cabinet between said mounting surface and said adjacent wall;
   (b) a cable access door pivotally attached to said cabinet, and adapted for pivoting movement between a closed position and an open position, and for sliding movement from said open position to a hidden position inside said cabinet and within said door-receiving compartment; and
   (c) attachment means for pivotably attaching said access door to said cabinet, and for permitting sliding movement of said access door from the open position to the hidden position.

2. A fiber optic cable management system according to claim 1, wherein said attachment means comprises a pair of spaced-apart door rails located at opposite sides of said door-receiving compartment and between said interior mounting surface and said adjacent cabinet wall for guiding movement of said door between the open position and the hidden position within said compartment.

3. A fiber optic cable management system according to claim 2, wherein said door rails comprises respective longitudinal grooves extending from one end thereof to the other, and wherein said access door comprises first and second outwardly projecting pins received within respective ones of said grooves of said door rails and cooperating with said door rails to permit sliding movement of said access door into and out of said door-receiving compartment.

4. A fiber optic cable management system according to claim 3, wherein said door rails comprise respective notches communicating with said grooves for receiving the pins of said access door into said grooves, and for removable attachment of said access door from said cabinet.

5. A fiber optic cable management system according to claim 4, wherein said door rails comprise respective integrally-formed bearings within which the pins of said access door rotate as said access door is pivoted between the open and closed positions.

6. A fiber optic cable management system according to claim 1, wherein said cabinet comprises a plurality of cable access openings formed within said cabinet walls for receiving and distributing fiber optic cable entering and exiting said cabinet.

7. A fiber optic cable management system according to claim 6, wherein at least one of said cable access openings comprises an outwardly curved trumpet flange adapted for controlling the bend radius of fiber optic cable.

8. A fiber optic cable management system according to claim 1, wherein said cabinet comprises a pivoted rear door movable between an open position and a closed position.

9. A fiber optic cable management system according to claim 1, wherein said cabinet comprises separate, interchangeable, top and bottom cabinet sections.

10. A fiber optic cable management system according to claim 9, and comprising opposing removable spacers located between said cabinet sections for adjusting the height of said cabinet.

11. A fiber optic cable management system according to claim 1, and comprising mounting brackets attached to said cabinet and adapted for mounting said cabinet on a vertical support rack.

12. A fiber optic cable management system according to claim 1, and comprising a plurality of rear clips located inside said cabinet and carried on said mounting surface for managing fiber optic cable entering said cabinet.

13. A fiber optic cable management system according to claim 12, wherein said mounting surface comprises a rear mounting track extending from one side of said cabinet to the other and carrying said plurality of rear clips for adjustable sliding movement along the length of said track.

14. A fiber optic cable management system according to claim 1, and comprising a plurality of cable connector plates located inside said cabinet and extending generally perpendicular to the interior mounting surface for interconnecting respective ends of fiber optic cable.

15. A fiber optic cable management system according to claim 14, wherein said connector plates comprise a respective plurality of vertically spaced adaptors.

16. A fiber optic cable management system according to claim 1, and comprising a plurality of front clips located inside said cabinet and carried on said mounting surface for managing fiber optic cable exiting said cabinet.

17. A fiber optic cable management system according to claim 16, wherein said mounting surface comprises a front mounting track extending from one side of said cabinet to the other and carrying said plurality of front clips for adjustable sliding movement along the length of said track.

18. A fiber optic cable management system, comprising:
(a) a cabinet comprising separate, interchangeable top and bottom cabinet sections defining respective cabinet walls and cable access openings for receiving and distributing fiber optic cable entering and exiting said cabinet, and an interior mounting surface for carrying cable management components adapted for managing fiber optic cable within said cabinet, said mounting surface being spaced-apart from and cooperating with an adjacent one of said cabinet walls to define a door-receiving compartment inside said cabinet between said mounting surface and said adjacent wall;
(b) a cable access door pivotably attached to said cabinet, and adapted for pivoting movement between a closed position and an open position, and for sliding movement from said open position to a hidden position inside said cabinet and within said door-receiving compartment; and
(c) attachment means for pivotably attaching said access door to said cabinet, and for permitting sliding movement of said access door from the open position to the hidden position.

* * * * *